United States Patent
Kölker et al.

(10) Patent No.: US 9,988,222 B2
(45) Date of Patent: Jun. 5, 2018

(54) SUPPLY DEVICE FOR THE SUPPLY OF FILLED SACKS TO A PALLETIZING DEVICE

(71) Applicant: Windmöller & Hölscher KG, Lengerich (DE)

(72) Inventors: Martin Kölker, Ibbenbüren (DE); Ralf Ahlers, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 0 days. days.

(21) Appl. No.: 14/696,504

(22) Filed: Apr. 27, 2015

(65) Prior Publication Data

US 2015/0307294 A1    Oct. 29, 2015

(30) Foreign Application Priority Data

Apr. 28, 2014 (DE) .......................... 10 2014 105 932

(51) Int. Cl.
*B65G 57/22* (2006.01)
*B65G 57/24* (2006.01)
(Continued)

(52) U.S. Cl.
CPC ............ *B65G 57/24* (2013.01); *B65G 15/30* (2013.01); *B65G 57/03* (2013.01); *B65G 57/09* (2013.01);
(Continued)

(58) Field of Classification Search
CPC ............... B65G 47/086; B65G 57/245; B65G 47/2445; B65G 17/005; B65G 47/244; B65G 47/32; B65G 57/06; B65G 57/24; Y10S 414/106

USPC ........ 198/374, 411, 413, 415, 435; 414/788, 414/788.1, 789.6, 791.6, 791.8, 792, 414/792.5, 792.6, 792.7, 793.4, 794.1, 414/794.2, 794.4, 794.7, 799, 922
See application file for complete search history.

(56) References Cited

U.S. PATENT DOCUMENTS 1,418,658 A * 6/1922 Ladd ...................... B65G 67/14
                                                      414/791.8
2,655,271 A * 10/1953 Cole .................... B65G 47/086
                                                      198/374
(Continued)

FOREIGN PATENT DOCUMENTS

DE    1275468        8/1968
EP    0095634 A1 * 12/1983 ............. B65G 47/32
(Continued)

OTHER PUBLICATIONS

Pruefungsantrag [Request for Examination] dated Mar. 7, 2016 from the Deutsches Patent—und Markenamt [German Parent and Trademark Office Re. Application No. 102014105932.8 and Its Translation Into English.
(Continued)

*Primary Examiner* — Gregory W Adams (57) ABSTRACT

The invention relates to a supply device for the supply of filled sacks to a palletizing device, comprising a main supply belt for the supply of a first row of filled sacks on a sliding area of the palletizing device, wherein beneath the main supply belt at least one secondary feed belt is assembled for the supply of another row of filled sacks on the sliding area beneath a first row of filled sacks.

10 Claims, 4 Drawing Sheets

(51) Int. Cl.
    *B65G 15/30*     (2006.01)
    *B65G 57/03*     (2006.01)
    *B65G 57/09*     (2006.01)
    *B65G 57/11*     (2006.01)
    *B65G 47/71*     (2006.01)

(52) U.S. Cl.
    CPC ............. *B65G 47/71* (2013.01); *B65G 57/11* (2013.01); *B65G 2201/0238* (2013.01)

(56) References Cited

U.S. PATENT DOCUMENTS

| | | | | |
|---|---|---|---|---|
| 2,971,659 A * | 2/1961 | Miller, Jr. | ............ | B65G 47/086 198/374 |
| 2,997,187 A * | 8/1961 | Burt | ............ | B65G 57/183 198/374 |
| 3,294,257 A * | 12/1966 | Davies | ............ | B65G 47/086 198/374 |
| 3,486,637 A * | 12/1969 | Hahn | ............ | B65G 57/06 414/789.6 |
| 3,587,876 A * | 6/1971 | Dahlem | ............ | B65G 47/086 198/374 |
| 3,954,190 A * | 5/1976 | Howard | ............ | B65G 57/245 198/367 |
| 3,986,596 A * | 10/1976 | Hamilton | ............ | B65G 17/005 198/442 |
| 4,255,074 A * | 3/1981 | Meratti | ............ | B65G 57/245 198/614 |
| 4,302,140 A * | 11/1981 | Donnelly | ............ | B65G 57/06 198/741 |
| 5,411,131 A * | 5/1995 | Haegele | ............ | B65G 43/08 198/347.4 |
| 5,716,189 A * | 2/1998 | Winski | ............ | B65G 57/245 414/799 |
| 6,105,751 A * | 8/2000 | Jentjens | ............ | B65G 47/715 198/435 |
| 6,106,220 A * | 8/2000 | Ouellette | ............ | B65G 57/005 414/796.2 |
| 6,126,383 A * | 10/2000 | Franklin | ............ | B65G 47/2445 198/374 |
| 6,264,422 B1 * | 7/2001 | Hennes | ............ | B65G 47/086 414/791.6 |
| 6,371,720 B1 * | 4/2002 | Ouellette | ............ | B65G 57/005 414/791.6 |
| 6,464,065 B2 * | 10/2002 | Herubel | ............ | B65G 47/31 198/347.4 |
| 6,568,524 B1 * | 5/2003 | Cornell | ............ | B65G 47/086 198/411 |
| 6,681,916 B2 * | 1/2004 | Hiroki | ............ | B65G 35/06 198/347.1 |
| 7,165,918 B2 * | 1/2007 | Kruse | ............ | B65H 29/52 209/644 |
| 7,665,597 B2 * | 2/2010 | Neville | ............ | B65G 13/075 198/411 |
| 8,272,497 B2 * | 9/2012 | Kaes | ............ | B65G 47/244 198/374 |
| 2004/0223839 A1 * | 11/2004 | Simkowski | ............ | B65G 17/005 414/791.6 |
| 2011/0076128 A1 * | 3/2011 | Johnsen | ............ | B65G 21/14 414/791.6 |

FOREIGN PATENT DOCUMENTS

FR     2085168     12/1971
FR     2370664 A1 *     6/1978     ........... B65G 47/086

OTHER PUBLICATIONS

Translation dated Dec. 21, 2015 of European Search Opinion dated Sep. 17, 2015 From the European Patent Office Re. Application No. 15156453.1.

Europaeischer Recherchenbericht und die Stellungnahme zur Europacischen Recherche [European Search Report and the European Search Opinion] dated Sep. 17, 2015 From the European Patent Office Re. Application No. 15156453.1.

* cited by examiner

SUPPLY DEVICE FOR THE SUPPLY OF FILLED SACKS TO A PALLETIZING DEVICE

RELATED APPLICATION

This application claims the benefit of priority of German Patent Application No. 10 2014 105 932.8 filed Apr. 28, 2014, the contents of which are incorporated herein by reference in their entirety.

DESCRIPTION

Background of the Invention

The present invention relates to a supply device for the supply of filled sacks to a palletizing device and a corresponding palletizing device.

It is known that for a better transportation and a better handling filled sacks can be stacked to a sack stacking. Normally this occurs on a pallet or as a pallet-free sack stacking for the transportation of this sack stacking. Therefore, it is necessary to perform the sacks to rows and to layers wherein each layer later performs a layer of the sack stacking. Known palletizing devices comprise therefore normally sliding devices which comprise a sliding area for a layer performance. It is now crucial that the filled sacks can be supplied to a layer building sliding area. Therefore, with known palletizing devices supply devices in form of conveyor belts are known. These convey the filled sacks on the sliding area of the sliding device. Subsequently, these layers are often configured with one or multiple rows of filled sacks assembled next to each other so that the slider further slides the inserted row of sacks in another position in order to be able to insert a second row of sacks through the conveyor belt of the supply device. Like already apparent this leads to a temporal disadvantage since for the performance of a layer the conveyor belt has to insert the different rows in the sliding device one after the other. These further leads to a higher cost effort since an amortization of the whole palletizing device occurs slower due to the slower palletizing speed.

SUMMARY OF THE INVENTION

It is the objective of the present invention to at least partially avoid the previously described disadvantages. Particularly, it is the objection of the present invention to increase the speed of the palletizing device in a cost efficient and simple manner.

The previous objective is solved by a supply device with the features of claim 1 and a palletizing device with the features of claim 7. Further features and details of the invention result from the dependent claims, the description and the drawings. Thereby, features and details which are described corresponding to the method according to the invention naturally also apply corresponding to the sack stacking according to the invention and vice versa so that according to the disclosure of the single aspects of the invention it can always be reciprocally related to.

The supply device according to the invention for the supply of filled sacks to a palletizing device may comprise a main supply belt for the supply of a first row of the filled sacks on the sliding area of the palletizing device. According to the invention the supply device is characterized in that beneath the main supply belt at least one secondary feed belt is assembled for the supply of another row of the filled sacks on the sliding area beneath the first row of filled sacks.

According to the invention thus the supply device may be upgraded with a secondary feed belt. This leads to the fact that temporarily parallel two rows of filled sacks can be inserted to the sliding area of the palletizing device at the same time or mainly at the same time. While with the known solutions of supply devices firstly a slider of the sliding device has to slide this first row in a second position after the supply of a first row before the second row can be inserted by the conveyor belt, now the supply of two rows can occur parallel in a manner according to the invention. This leads so to say to a halving of the necessary time to insert both rows. Naturally, also two or more secondary feed belts are possible within the sense of the present invention. Particularly, the amount of the secondary feed belts is oriented at the amount of maximum rows which can be configured in an overview of the sliding area. It is also preferred that the total from main supply belt and all secondary feed belts corresponds to the amount of the maximal rows in a layer for the sack stacking.

According to the invention thereby the secondary feed belt may be configured completely independent from the main supply belt. So for example an own control device and/or an own actuation device can be intended in order to operate the secondary feed belt for the supply of the further rows of the filled sacks.

The sliding area on which the overview is produced is so to say automatically filled at the same time so that also the position performance can occur with a doubled speed. A corresponding conveyor belt as a main supply belt and also as a secondary feed belt is preferably performed as a belt conveyor. However, basically also other conveying possibilities for example a slide promotion with the help of air pressure nozzles or sliders is possible according to the sense of the present invention.

Naturally, the main supply belt and the secondary feed belt can thus be distinguished from one another by the geometrical dimension. Particularly, this is about a different width related to the main supply belt and the secondary feed belt. Thereby, the main supply belt is particularly used with each palletizing task. The secondary feed belt can be seen as an optional connectable conveyor belt which can be used with palletizing tasks which for example deal with smaller and narrower filled sacks. This leads to the fact that a supply device according to the invention can be flexibly used for all palletizing tasks. Particularly, also classic palletizing tasks can be processed with a single conveyor belt by the separate use of the main supply belt.

Depending on the actual palletizing task the gear devices for the single conveyor belts can also be intended for different speeds. So for example different gears or different operating strengths for the single gear devices are possible for the main supply belt and the secondary feed belts within the sense of the present invention.

For the performance of a layer an overview is intended which contains a corresponding assembly of the singular filled sacks relative to another. This overview is performed on the sliding area. Thereby, preferably upstream of the supply device a turning device is intended which is later described in more detail which already fills the conveyor belts with aligned filled sacks corresponding for the to be achieved overview. Subsequently, the conveyor belts are operated already corresponding to the overview in order to convey these directed sacks as an overview on the sliding area.

The sliding device and particularly the sliding area of the palletizing device now serves for the fact that subsequent to the operation of the layer with the help of a slider to slide this layer of filled sacks to a sliding table beneath the sliding area. This sliding table is preferably assembled above the lifting device so that an opening of the sliding table, for example by a diversion of the single sliding table plates, a settling of the performed and shifted layers of the lifting device can occur. Thereby, this can occur directly on the lifting device or separately on a plate which is assembled at the lifting device. Subsequently, the lifting device moves downwards with the degraded layer of the filled sacks so that the sliding table can reclose in order to receive the next layer. This is carried out as long as the performing sack stacking comprises the final height.

Beneath the basical advantage of an increasing of the total speed of the palletizing a supply device according to the invention can be refitted. So it is for example possible to refit at least a secondary feed belt to a corresponding known and already existing first main supply belt so that thereby also the quality according to the invention can be achieved with already existing palletizing devices.

It can be an advantage when with the supply device of the main supply belt and/or the at least one secondary feed belt is used as a belt conveyor. Particularly, this is an actively actuated belt conveyor for the main supply belt and the at least one secondary feed belt. Thereby, for example a drive device in form of an electric motor and/or a frequency converter can be used in order to insert an active actuation force to the main supply belt and/or the secondary feed belt. However naturally basically also roller bearings are possible. Also rollers which support a resting belt conveyor thereon are usable within the sense of the present invention for the conveyor belts. Naturally, however also a combination with other conveyor belts like for example an active or passive air cushion conveyance is possible within the sense of the present invention.

Another advantage is achievable when with a supply device according to the invention the main supply belt and the at least one secondary feed belt comprises parallel or mainly parallel conveyor directions. So basically main supply belt and secondary feed belt can be freely assembled at the palletizing device. For example it is possible that a main supply belt gets the conveyor of the filled sacks provided from another side as for the secondary feed belt. Preferably is however when the single conveyor directions are assembled parallel or mainly parallel towards one another. This leads to the fact that also with the conveyance of the filled sacks the single conveyed rows of the filled sacks are assembled parallel or mainly parallel to the sliding area. With the conveyance direction the supply direction has to be understood thus the direction with which the filled sacks leave the respective conveyor belt to the sliding area. The single conveyor belts itself can thereby naturally comprise curves in order to lead to this feed position. The parallel distribution is particularly configured for a neighbouring assembly of the main supply belt and secondary feed belt thus an assembly of the two conveyor belts directly next to each other on a common side of the palletizing device. For this automatic performance of the overview with the different rows here a particularly space saving embodiment is presented.

Another advantage can be when with the supply device according to the invention the secondary feed belt comprises a smaller width as the main supply belt. Like already described multiple times the secondary feed belt can be used as a separate connectable secondary feed belt for particular palletizing tasks. The main supply belt however is used with each palletizing task. The reduction of the width of the secondary feed belt leads in the first step to a reduction of the space requirement of the supply device according to the invention. At the same time also the necessary material cost, the corresponding weight and the overall complexity of the supply device is reduced. Since generally more complex palletizing tasks are accompanied with smaller filled sacks and particularly with such more complex palletizing tasks the speed has to be observed, the width of the secondary feed belt can be adapted to such smaller filled sacks. Greater sacks are processed with the common smaller palletizing speed, so that here the main supply belt is sufficient for the single supply. Thereby, the amount of used conveyor belts can be configured free and flexible for the respective necessary palletizing task particularly in dependence of the respective actual size of the filled sacks. Naturally, also two or more conveyor belts can be intended which all comprise different sizes of widths. Thereby, for example also a second and a third secondary feed belt can be intended which consistently comprises a smaller width related to the main supply belt and to the neighbouring secondary feed belt. Moreover, the necessary sliding distance of the slider on the sliding area is additionally reduced so that also with a single usage of the main supply belt alone an unnecessary long sliding distance with corresponding unnecessary larger sliding times can be avoided or at least reduced.

An advantage is moreover when with the supply device according to embodiments of the invention a secondary feed belt comprises an actuation device for a faster actuation than an actuation device of the main supply belt. Particularly, the secondary feed belt can in this manner take the corresponding row orientation into consideration. Thereby preferably already the complete row of the layer is assembled on the secondary feed belt so that in a single fast actuation the whole row, namely two or more sacks, can be conveyed to the sliding area. The operation for a faster actuation can thereby be chosen with the corresponding faster rotating electro motor or also by a corresponding gear. Naturally, also a common actuation device with corresponding two actuators and the corresponding gears can be provided for this embodiment of the present invention.

It is further an advantage when with the supply device according to the invention the main supply belt and the at least one secondary feed belt is performed for the supply of filled sacks from at least one of the following materials:
paper
fabric
film
fleece The previous enumeration is a not final list. Naturally the single described materials can be combined with one another or with no further described materials. For example, the single conveyor belts or their covers or their attachments can for example be adapted in order to ensure a particularly careful transportation possibility for the filled sacks. Further it is possible that such attachments or applications are performed interchangeable in order to provide a flexible adaptation of the single conveyor belts. Beneath the saving of materials of the sacks however also an increased conveyor quality for example with an increased friction for the corresponding material can be an aim of the selection for the adaptation. Particularly, a particular universal material pairing is provided so that the main supply belt and the secondary feed belt can be used for a possibly great selection of different materials of the filled sacks.

Likewise an object of the present invention is a palletizing device for stacking of filled sacks to a sack stacking comprising a lifting device and a sliding device with a sliding area, a sliding table and a slider for the movement of a layer of filled sacks from the sliding area to the sliding table. A palletizing device according to the invention is characterized in that for the supply of the filled sacks a supply device according to the present invention is assembled beneath the sliding device. Thereby, a palletizing device according to the invention comprises the same advantage like they are described in detail regarding the supply device according to the invention. The lifting device can thereby particularly be driven up and down so that a corresponding layer-wise or coating-wise stacking of the single layers of the filled sacks can occur. Naturally, the palletizing can occur on a temporary pallet, a transport pallet or even pallet-free directly on the lifting device. Particularly, recesses for a lifting with a fork of a fork lift can be intended which is assembled directly within the layer of the sacks. The supply of the filled sacks occurs thereby in described manner directly on the sliding area.

A palletizing device according to embodiments of the invention can be further developed in a way that the secondary feed belt of the supply device in direction of the sliding direction of the sliding device is shifted beneath the main supply belt. Particularly, the main supply belt is the entrance conveyor belt which inserts the corresponding sack row directly at the edge of the slider in the sliding device. This row subordinated in sliding direction correspondingly the secondary feed belt is intended so that the sliding direction of the slider is reduced when only the main supply belt shall be used. This leads for such palletizing tasks to a reduced time situation for the performance of the palletizing process.

It is also an advantage when with a palletizing device according to the present embodiments a turning device for turning of the filled sacks is assembled upstream of the supply device. Thereby, different mechanisms for the turning device can be used like it is subsequently described. Particularly, in this manner a desired overview of the sliding area can be prepared by the turning device. From the turning device the single conveyor belts already receive sacks with the corresponding orientation so that with a correct orientation the single filled sacks or already the whole row of sacks can be conveyed to the sliding area. Correspondingly also the conveyance device can be intended within the turning device in order to perform a turning. The turning device is thereby particularly for each conveyor belt separate or commonly intended for all conveyor belts. Upstream of the turning device thereby a process device can be intended from which the filled sacks come out. Thereby it is particularly a sack filling machine for example a so called form fill and seal machine.

The palletizing device which comprises a corresponding turning device corresponding to the previous attachment can be further processed in a way that the turning device comprises at least one of the following:
 gripper arm
 air pressure nozzle
 turning belts with different speeds
 slider The previous enumeration is a non final list. Naturally, in a turning device also different forms of turning can be freely combined with one another. A turning with a help of a gripper occurs by active geometric correlation and thereby a contacting with a gripper for the particular sack. Air pressure nozzles can with light sacks perform a corresponding alteration of the orientation of the sack. Also single conveyor belts can be processed parallel next to each other with different speeds in order to ensure a corresponding turning of the sacks. Also a lateral intervention by a slider can lead to a solution according to the invention of this rotation task.

BRIEF DESCRIPTION OF THE DRAWINGS

Further advantages, features and details of the invention result from the following description, in which with reference to the drawings embodiments of the invention are described in detail. Thereby, the features described in the claims and in the description can be each single or in every combination be essential for the invention. It is schematically shown:

DESCRIPTION OF SPECIFIC EMBODIMENTS OF THE INVENTION

Figure 1:
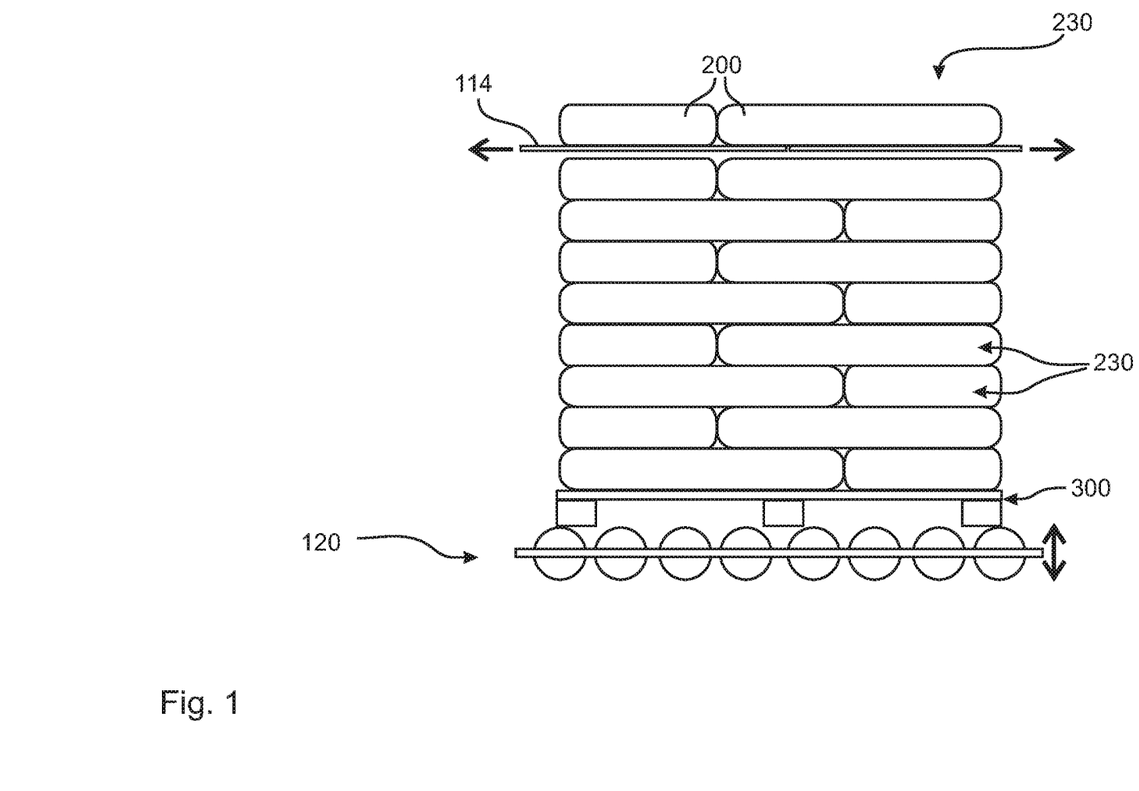
FIG. 1 an embodiment of a sack stacking which is produced with the palletizing device according to the invention, FIG. 2 a top view of a supplying device according to the invention in a palletizing device according to the invention and FIG. 3 the embodiment of FIG. 2 subsequent to the sliding process.

FIG. 1 schematically shows a lateral view how a sack stacking should be produced. This sack stacking comprises a plurality of different layers 230 which are here stacked to a sack stacking on a pallet 300. The pallet 300 is assembled on a lifting device 120 like shown with the double arrow and can be moved upwards and downwards. The drawing according to FIG. 1 shows an already progressed stacking process. The first layer is thereby processed in a way that the lifting device 120 is directly under the sliding table 114. At this time a layer 230 of filled sacks 200 is already assembled on the sliding table 114 like also shown in FIG. 1. If now the sliding table 114 opens the whole layer 230 falls a short distance to the lifting device 110 or to the there assembled pallet 300. Subsequently, the lifting device 120 is moved downwards with the palette 300 and with the layer 230 assembled on the pallet 300 so far that the sliding table 114 can reclose and take up the subsequent layer 230 through the slider 116. These steps are repeated as long as the desired staple height is reached and all layers 230 are assembled on the palette 300.

Figure 2:
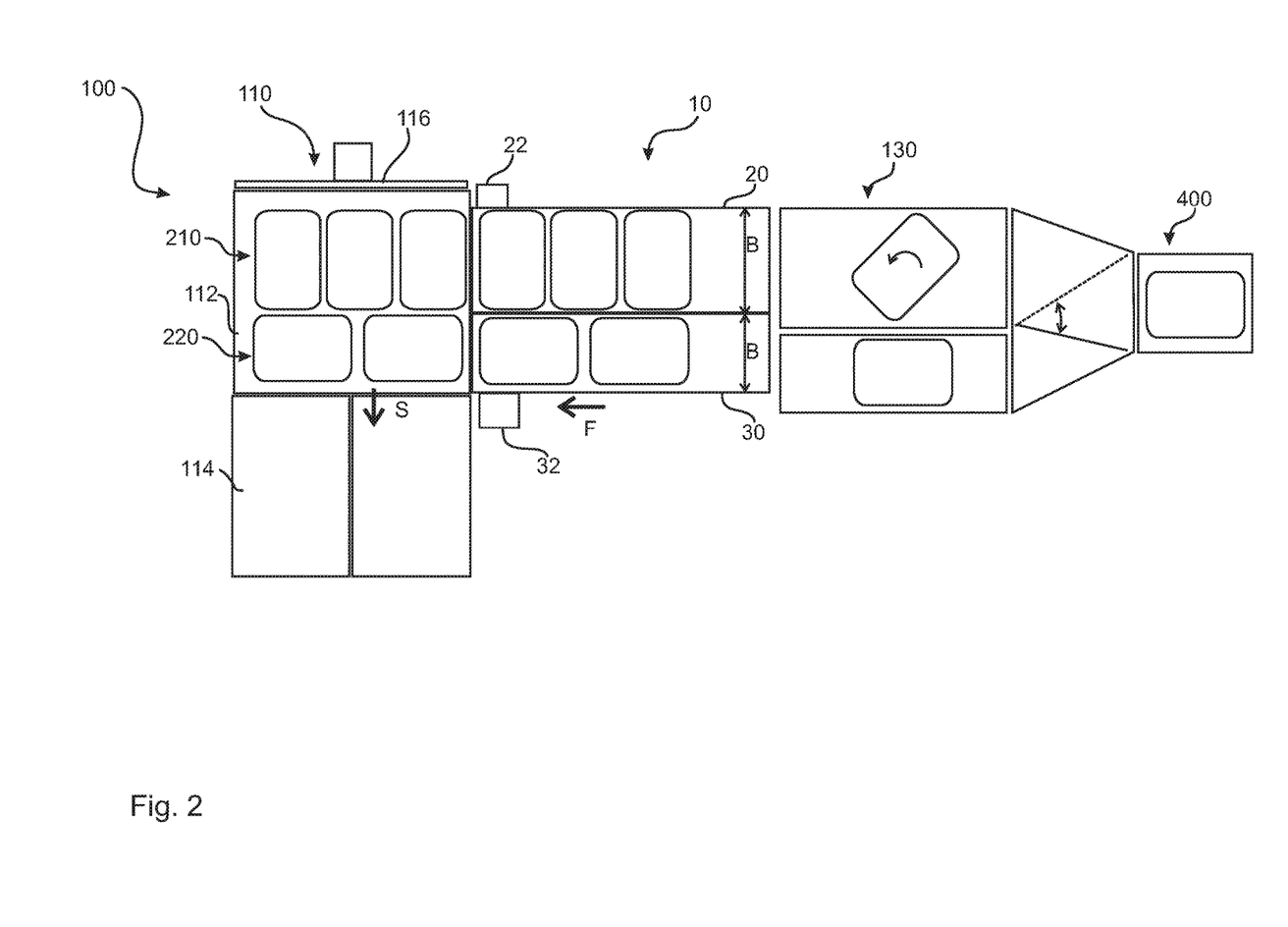
Figure 3:
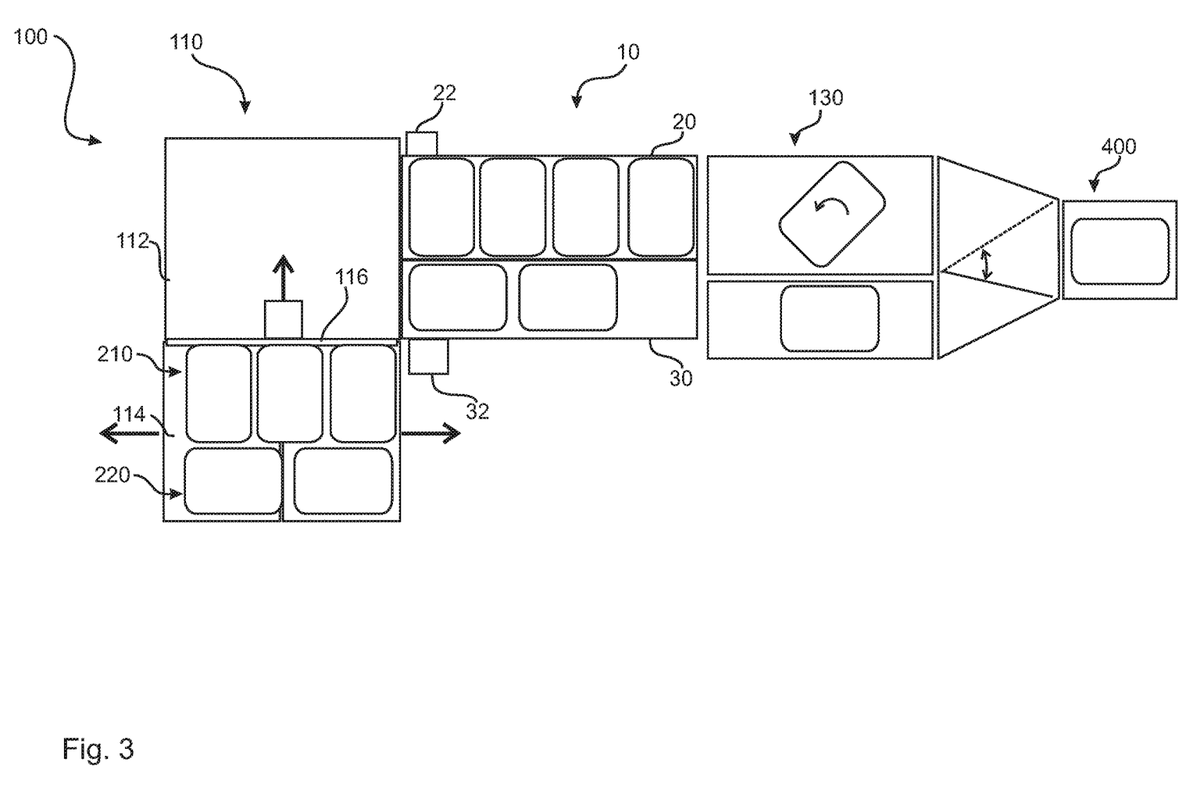

FIGS. 2 and 3 show a palletizing process in a top view. Thereby, a process device 400 is intended which for example as a so called form-fill-and-seal-machine performs a filling and producing of the filled sacks 200. Subsequently, a schematic switch is shown which conveys the sacks 200 to a turning device 130 with different turning positions. Like it can be recognized the upper turning position is performed for a 90° rotation for the sacks 200 while on the lower side no or only a slight rotation of the sacks 200 is performed. Subsequently an embodiment of a supply device 10 according to the invention is assembled. This is performed with a main supply belt 20 and a secondary feed belt 30. The width B of the main supply belt 20 is thereby greater as the width B of the secondary feed belt 30. This results from the different palletizing tasks. The embodiment and the situation according to FIGS. 2 and 3 shows smaller sacks with which by high speed both conveyor belts 20 and 30 are used. Thereby, both rows 210 and 220 of the filled sacks are conveyed at the same time or mainly at the same time to the sliding area 112 of the sliding device. Subsequently, the slider 160 can perform the sliding movement and thereby perform the whole layer 230 from both rows 210 and 220 of the filled sacks 200 on the sliding table 114. If the layer 230 is assembled on the sliding table 114 an opening occurs like already described regarding to FIG. 1.

Likewise a separate actuation possibility with an actuation device 22 for the main supply belt 20 and an actuation device 32 for the secondary feed belt 30 can be recognized. While with complex and possibly fast performing palletizing tasks the configuration is chosen like shown in FIGS. 2 and 3 with particularly great sacks and correspondingly long-lasting palletizing tasks a reduction of the conveyor belts can be performed. Particularly, only the main supply belt 20 is used and the secondary feed belt 30 is shut down. This shows one time more the high flexibility in the possible application possibility for a supply device 10 according to the invention.

Figure 4:
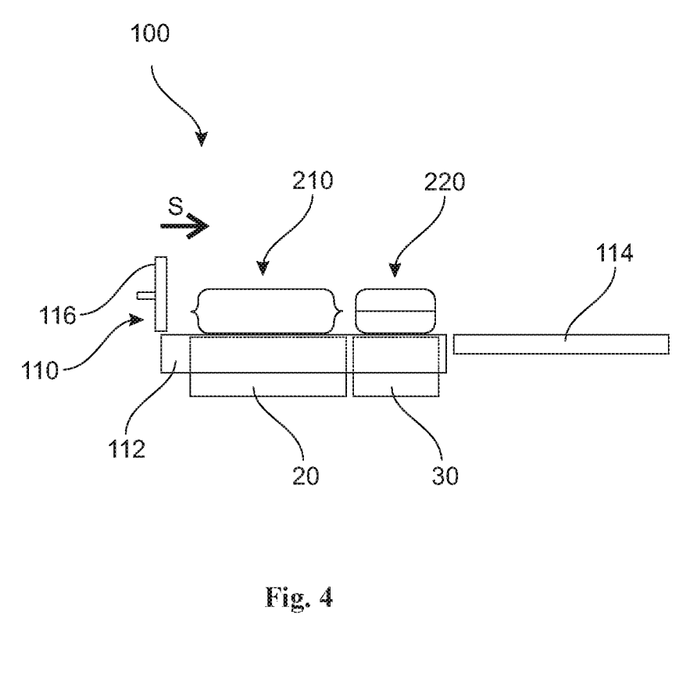
FIG. 4 shows a relationship between the main and secondary feed belts according to the present embodiments.

Reference is now made to FIG. 4, which is a view of the lower left hand block of FIG. 2 orientated vertically. Secondary supply belt 30, which slides in the direction of arrow S, is below primary belt 20 on one level.

The previous description of the embodiment describes the present invention only within the scope of examples. Naturally, also single features of the embodiments as far as technically meaningful can be freely combined with one another without leaving the scope of the present invention.

REFERENCE LIST 10 supply device
20 main supply belt
22 actuation device
30 secondary feed belt
32 actuation device
100 palletizing device
110 sliding device
112 sliding area
114 sliding table
116 slider
120 lifting device
130 turning device
200 filled sack
210 first row
220 further row
230 layer
300 pallet
400 processing device
F conveyance direction
B width
S sliding direction

What is claimed is:

1. Supply device for supplying of filled sacks to a palletizing device, comprising:
a main supply belt for the supply of a first row of filled sacks onto a sliding area of the palletizing device, said main supply belt having a first width;
a secondary feed belt located beneath said main supply belt for the supply of another row of filled sacks onto the sliding area, said secondary feed belt having a second width, said secondary feed belt configured to supply said another row of filled sacks beneath the first row of filled sacks;
a turning device having first and second turning positions corresponding to each of said main supply belt and said secondary feed belt, said turning device being configured to orient respective filled sacks for respective first and second widths, said second width being smaller than said first width, said respective filled sacks thereby being differently oriented for said main supply belt and said secondary feed belt;
wherein the main supply belt consists of a single belt and the secondary feed belt is a single belt, the secondary feed belt comprising an actuation device configured to drive said secondary feed belt faster than said main supply belt, to account for said respectively different orienting of said filled sacks, said actuation device comprising one member of the group consisting of:
a motor for driving said secondary feed belt, said motor being faster than a motor driving said main supply belt,
a gear, and
a common actuation device with two output drives and respective transmissions.

2. Supply device according to claim 1,
wherein
the main supply belt is designed as a belt conveyor.

3. Supply device according to claim 1,
wherein
the main supply belt and the at least one secondary teed belt have parallel conveyance directions.

4. Supply device according to claim 1,
wherein
the secondary teed belt comprises an actuation device for a faster actuation than an actuation device of the main supply belt.

5. Palletizing device for a stacking of filled sacks to a sack stacking, comprising a lifting device and a sliding device with a sliding area, a sliding table and a slider for movement of a layer of filled sacks from a sliding area to a sliding table, wherein
for the supply of the filled sacks a supply device with the features of claim 1 is assembled beneath the sliding device.

6. Palletizing device according to claim 5,
wherein
the secondary feed belt of the supply device is shifted beneath the main supply belt in the direction of the sliding direction of the sliding device.

7. Palletizing device according to claim 1,
wherein
the turning device comprises at least one member of the group consisting of:
gripper
air pressure nozzles
turning belts with different speeds
slider.

8. Supply device according to claim 1,
wherein
the at least one secondary feed belt is designed as a belt conveyor.

9. Supply device for supplying of filled sacks to a palletizing device, comprising:
a main supply belt for the supply of a first row of filled sacks onto a sliding area of the palletizing device, said main supply belt having a first width;
a secondary feed belt located beneath said main supply belt for the supply of another row of filled sacks onto the sliding area, said secondary feed belt having a second width, said secondary feed belt configured to supply said another row of filled sacks beneath the first row of filled sacks;

a turning device having first and second turning positions corresponding to each of said main supply belt and said secondary feed belt, said turning device being configured to orient respective filled sacks for respective first and second widths, said second width being smaller than said first width, said respective filled sacks thereby being differently oriented for said main supply belt and said secondary feed belt, wherein the main supply belt comprises a single belt and the secondary feed belt is a single belt, the secondary feed belt comprising an actuation device, said actuation device comprising one member of the group consisting of:
a motor for driving said secondary feed belt,
a gear, and
a common actuation device with two output drives and respective transmissions.

10. Supply device for supplying of filled sacks to a palletizing device, comprising:
at least one main supply belt for the supply of a first row of filled sacks onto a sliding area of the palletizing device, said main supply belt having a first width;
at least one secondary feed belt located beneath said main supply belt for the supply of another row of filled sacks onto the sliding area, said secondary feed belt having a second width, said secondary feed belt configured to supply said another row of filled sacks beneath the first row of filled sacks;
a turning device having first and second turning positions corresponding to each of said main supply belt and said secondary feed belt, said turning device being configured to orient respective filled sacks for respective first and second widths, said second width being smaller than said first width, said respective filled sacks thereby being differently oriented for said main supply belt and said secondary feed belt;
the secondary feed belt comprising an actuation device configured to drive said secondary feed belt faster than said main supply belt, to account for said respectively different orienting of said filled sacks, said actuation device comprising one member of the group consisting of:
a motor for driving said secondary feed belt,
a gear, and
a common actuation device with two output drives and respective transmissions.

* * * * *